(12) United States Patent
Bhat et al.

(10) Patent No.: US 10,436,647 B2
(45) Date of Patent: *Oct. 8, 2019

(54) NON-CONTACT TEMPERATURE MEASUREMENT SENSOR

(71) Applicant: Maxim Integrated Products, Inc., San Jose, CA (US)

(72) Inventors: Jerome C. Bhat, Palo Alto, CA (US); Kuolung Lei, San Jose, CA (US); Craig A. Easson, San Jose, CA (US); Arvin Emadi, San Jose, CA (US); Judy Hermann, Mountain View, CA (US)

(73) Assignee: MAXIM INTEGRATED PRODUCTS, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/149,627

(22) Filed: Oct. 2, 2018

(65) Prior Publication Data

US 2019/0101454 A1    Apr. 4, 2019

Related U.S. Application Data

(63) Continuation of application No. 14/974,464, filed on Dec. 18, 2015, now Pat. No. 10,113,915.

(60) Provisional application No. 62/163,923, filed on May 19, 2015.

(51) Int. Cl.
| | |
|---|---|
| *G01J 5/00* | (2006.01) |
| *G01K 1/00* | (2006.01) |
| *G01K 1/08* | (2006.01) |
| *G01J 5/12* | (2006.01) |
| *G01J 5/04* | (2006.01) |
| *G01J 5/02* | (2006.01) |

(Continued)

(52) U.S. Cl.
CPC .............. *G01K 1/08* (2013.01); *G01J 5/024* (2013.01); *G01J 5/0215* (2013.01); *G01J 5/045* (2013.01); *G01J 5/06* (2013.01); *G01J 5/0806* (2013.01); *G01J 5/0831* (2013.01); *G01J 5/12* (2013.01); *G01J 2005/0048* (2013.01); *G01J 2005/066* (2013.01); *G01J 2005/068* (2013.01)

(58) Field of Classification Search
USPC ........................................ 374/163, 208, 121
See application file for complete search history.

(56) References Cited

U.S. PATENT DOCUMENTS

| | | |
|---|---|---|
| 2005/0081905 A1 | 4/2005 | Lan et al. |
| 2008/0291968 A1 | 11/2008 | Ernst et al. |
| 2009/0296775 A1 | 12/2009 | Yamaguchi |

(Continued)

*Primary Examiner* — Mirellys Jagan
(74) *Attorney, Agent, or Firm* — Kevin E. West; Advent, LLP (57) ABSTRACT

The present disclosure is directed to a sensor package having a thermopile sensor and a reference (or dark channel) thermopile sensor disposed therein for temperature measurements. In one or more implementations, the sensor package includes a substrate, a thermopile sensor disposed over the substrate, a reference thermopile sensor disposed over the substrate, a reference temperature sensor disposed over the substrate surface, a lid assembly disposed over the thermopile sensor and the reference thermopile sensor, and a thermo-optical shield. The thermo-optical shield defines an aperture over the thermopile sensor such that at least a portion of the thermo-optical shield is positioned over the reference thermopile sensor to provide optical and thermal shielding for portions of the sensor package.

12 Claims, 4 Drawing Sheets

(51) Int. Cl.
*G01J 5/06* (2006.01)
*G01J 5/08* (2006.01)

(56) References Cited

U.S. PATENT DOCUMENTS

| | | |
|---|---|---|
| 2011/0110394 A1 | 5/2011 | Kaess et al. |
| 2015/0177070 A1 | 6/2015 | Maes et al. |
| 2016/0123616 A1 | 5/2016 | Pei et al. |
| 2016/0178443 A1 | 6/2016 | Ernadi et al. |
| 2016/0247955 A1 | 8/2016 | Dumont et al. |
| 2016/0282194 A1 | 9/2016 | Barnett et al. |
| 2016/0305829 A1 | 10/2016 | Emadi et al. |
| 2017/0122799 A1 | 5/2017 | Okudo et al. |

NON-CONTACT TEMPERATURE MEASUREMENT SENSOR

CROSS-REFERENCE TO RELATED APPLICATIONS

The present application is a continuation of U.S. Non-Provisional patent application Ser. No. 14/974,464 (U.S. Pat. No. 10,113,915), filed on Dec. 18, 2015, which claims the benefit under 35 U.S.C. § 119(e) of U.S. Provisional Application Ser. No. 62/163,923, entitled NON-CONTACT TEMPERATURE MEASUREMENT SENSOR, filed May 19, 2015. U.S. Provisional Application Ser. No. 62/163,923 is hereby incorporated by reference in its entirety.

BACKGROUND

Thermopile sensors convert thermal energy into electrical energy. These sensors may utilize several thermocouples to generate an output voltage proportional to a local temperature difference (e.g., a temperature gradient). These thermopile sensors may be utilized in the medical industry to measure body temperature, in heat flux sensors, and/or gas burner safety controls.

SUMMARY

A sensor package is described having a thermopile sensor and a reference (or dark channel) thermopile sensor disposed therein. In one or more implementations, the sensor package includes a substrate, a thermopile sensor disposed over the substrate, a reference thermopile sensor disposed over the substrate, a reference temperature sensor disposed over the substrate surface, a lid assembly disposed over the thermopile sensor and the reference thermopile sensor, and a thermo-optical shield. The lid assembly includes a transparent structure that passes electromagnetic radiation occurring in a limited spectrum of wavelengths (e.g., infrared radiation [IR]). The thermo-optical shield defines an aperture over the thermopile sensor such that at least a portion of the thermo-optical shield is positioned over the reference thermopile sensor. The thermo-optical shield is configured to at least substantially block the electromagnetic radiation occurring in a limited spectrum of wavelengths from reaching the reference thermopile sensor, and can be mounted within the sensor package, mounted to the lid assembly, or integrated into the lid assembly.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The detailed description is described with reference to the accompanying figures. The use of the same reference numbers in different instances in the description and the figures may indicate similar or identical items.

DETAILED DESCRIPTION

Overview

Thermopile sensors are utilized in a variety of applications. For example, a thermopile is an infrared radiation (IR) detector (e.g., electromagnetic radiation) that can be used for making non-contact temperature measurements. A thermopile can include several thermocouples coupled together. Thermopiles are used to provide an output in response to temperature as part of a temperature measuring device, such as in infrared thermometers, used to measure body temperature. While thermopiles detect electromagnetic radiation from an object of interest, the thermopiles can also detect electromagnetic radiation from other objects that are not of interest. Also, a thermopile outputs a voltage that depends on the temperature difference of an object or environment and its own temperature. Thus, a reference temperature sensor may be utilized to determine an object's temperature, an ambient temperature, or the like. Further, a sensor package can include its own temperature gradients throughout the structure of the sensor, which can affect temperature readings from one thermopile relative to another thermopile.

Therefore, a sensor package is described having a thermopile sensor and a reference (or dark channel) thermopile sensor disposed therein. In one or more implementations, the sensor package includes a substrate, a thermopile sensor disposed over the substrate, a reference thermopile sensor disposed over the substrate, a reference temperature sensor disposed over the substrate surface, a lid assembly disposed over the thermopile sensor and the reference thermopile sensor, and a thermo-optical shield. The lid assembly includes a transparent structure that passes electromagnetic radiation occurring in a limited spectrum of wavelengths (e.g., infrared radiation [IR]). The thermo-optical shield defines an aperture over the thermopile sensor such that at least a portion of the thermo-optical shield is positioned over the reference thermopile sensor. The thermo-optical shield is configured to at least substantially block the electromagnetic radiation occurring in a limited spectrum of wavelengths from reaching the reference thermopile sensor, and can be mounted within the sensor package, mounted to the lid assembly, or integrated into the lid assembly. For example, the thermo-optical shield at least substantially prevents electromagnetic radiation emitted from an object of interest to reach the reference thermopile sensor, and at least substantially obscures variations in the temperature of the lid assembly from the fields of view of the thermopile sensors.

Example Implementations

Figure 1:
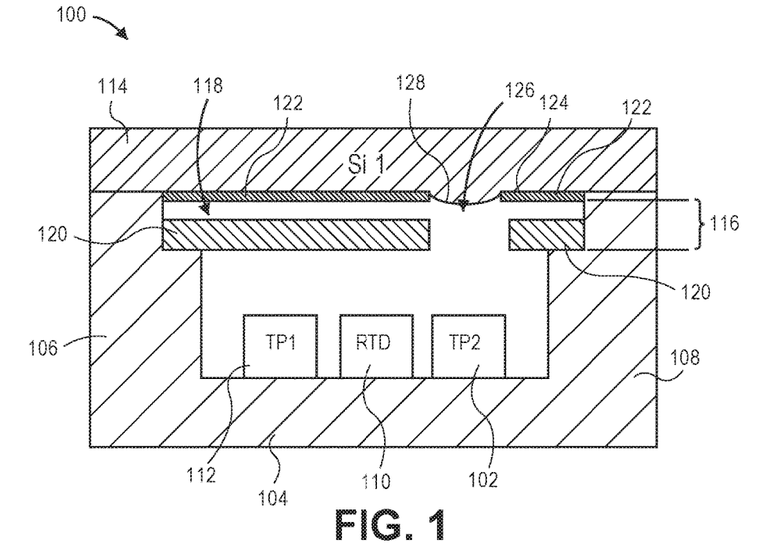
FIG. 1 is a partial cross-sectional side view illustrating a sensor package including a thermopile sensor, a reference thermopile sensor, and a reference temperature sensor disposed therein in accordance with an example implementation of the present disclosure.

FIG. 1 illustrates an example sensor package 100 in accordance with an example implementation of the present disclosure. As shown, the sensor package 100 includes a thermopile sensor 102 that senses electromagnetic radiation transfer between the thermopile sensor 102 and an object or an ambient environment. For example, an object emits electromagnetic radiation having a wavelength characteristic according to its temperature. More specifically, the radiation has a wavelength range that depends on the temperature of the object or environment. The thermopile sensor 102 senses changes in electromagnetic radiation transfer and translates the electromagnetic radiation change into a corresponding electrical signal (e.g., converts thermal energy into corresponding electrical energy). For instance, the thermopile sensor 102 translates the electromagnetic radiation change into a corresponding voltage signal. In implementations, the thermopile sensor 102 detects electromagnetic radiation having a first limited spectrum of wavelengths (e.g., wavelengths between a first wavelength and a second wavelength). For example, the thermopile sensor 102 is configured to detect electromagnetic radiation occurring within the infrared spectrum. In some implementations, the thermopile sensor 102 includes an absorber to improve the efficiency of the electromagnetic radiation absorption.

As shown, the thermopile sensor 102 is positioned over a substrate 104. The sensor package 100 includes support structure. For example, as shown in FIG. 1, a first wall structure 106 and a second wall structure 108 are employed adjacent to the substrate 104 to at least partially enclose the thermopile sensor 102. The substrate 104 and the wall structures 106, 108 comprise material that at least substantially prevents the transmission of radiation. For example, the substrate 104 and the wall structures 106, 108 may comprise metal materials, metallic alloys, and ceramic materials, such as glass, $SiO_2$, AlN, and/or $Al_2O_3$. In some implementations, the substrate 104 comprises a printed circuit board (PCB). The first wall structure 106 and the second wall structure 108 are illustrated for example purposes. However, it is understood that the support structure may employ multiple wall structures that may be conjoined to enclose the components of the sensor package, where the support structure can include the substrate 104 as a unitary construction. The support structure may be utilized to selectively block electromagnetic radiation from entering the sensor package 100. The support structure may also function as a hermetic seal to at least substantially prevent air from entering the sensor package 100.

As shown in FIG. 1, the sensor package 100 includes a reference temperature sensor 110 and a reference thermopile sensor 112. The reference temperature sensor 110 may be positioned over the substrate 104 and adjacent to the thermopile sensor 102 and the reference thermopile sensor 112. As discussed herein, the thermopile sensor 102 detects electromagnetic (e.g., infrared) radiation exchange associated the components within the sensor package 100 and an external object or environment. The reference thermopile sensor 112 is configured to detect the electromagnetic (e.g., infrared) radiation associated with the components within the sensor package 100. The signal from the thermopile sensor 102 can be processed (e.g., a subtraction protocol) to remove signal components that are the same as those resulting from the reference thermopile sensor 112 to provide a signal that represents a temperature of the external object or environment. The signal processing may occur within the digital domain or the analog domain. For example, an electrical signal that is common to the thermopile sensor 102 and the reference thermopile sensor (e.g., an electrical signal that represents an electromagnetic radiation associated with the sensor package) can be removed to generate a signal that represents a temperature of the external object or environment. In some instances, the thermopile sensor 102 and the reference thermopile sensor 112 may be integrated together on the same integrated circuit die. In another instance, the thermopile sensor 102 and the reference thermopile sensor 112 may be separate sensors (e.g., fabricated as standalone die). Additionally, in some implementations, the reference temperature sensor 110 may also be incorporated on or integrated with the standalone die having the thermopile sensor 102 and the reference thermopile sensor 112. The reference temperature sensor 110 may comprise a resistive temperature detector (RTD), a complementary metal-oxide semiconductor based temperature sensor, a thermistor, an integrated bandgap voltage reference, a thin film resistor, or any sensor that converts absolute temperature to an electrically measured signal.

In an implementation, the reference temperature sensor 110 detects signals that relate to the temperature reference for the thermopile sensor 102 and the reference thermopile sensor 112. For example, as shown in FIG. 1, the sensor package 100 includes a transparent structure 114 positioned over the thermopile sensor 102, the reference temperature sensor 110, and the reference thermopile sensor 112. Together, the substrate 104, the support structure (e.g., illustrated as wall structures 106, 108), and the transparent structure 114 at least partially comprises a package that encloses the thermopile sensor 102 and the reference temperature sensor 110. In implementations, the transparent structure 114 is configured to pass electromagnetic radiation occurring within the limited spectrum of wavelengths (e.g., infrared radiation) and to filter light occurring having a wavelength not within the limited spectrum of wavelengths. In some embodiments, the transparent structure 114 comprises silicon. As shown, the sensor package 100 includes a thermo-optical shield 116 positioned between the transparent structure 114 and the thermopile sensors (e.g., the thermopile sensor 102 and the reference thermopile sensor 112). The thermo-optical shield 116 is configured to at least substantially prevent transmission of the electromagnetic radiation occurring within the limited spectrum of wavelengths (as well as other stray electromagnetic radiation). Further, the thermo-optical shield 116 is configured to at least substantially obscure variations in the temperature of portions of the sensor package 100 from the fields of view of the thermopile sensors (e.g., the thermopile sensor 102 and the reference thermopile sensor 112).

The thermo-optical shield 116 includes a thermal insulation layer 118 and an electromagnetic blocker 120. The thermal insulation layer 118 can comprise a material that is configured to at least substantially obscure variations in the temperature of portions of the sensor package 100 from the fields of view of the thermopile sensors (e.g., the thermopile sensor 102 and the reference thermopile sensor 112) and can include, for example a gaseous material (e.g., an air gap, as shown in FIG. 1), a thermally-insulating dielectric material (e.g., silicon oxide, polyamide, or so forth). The electromagnetic blocker 120 can comprise a suitable electromagnetic blocking material, such as a metallic material, a silicon material, a germanium material, a ceramic, a glass, a polymeric material, or the like. In one or more implementations, the transparent structure 114, the thermal insulation layer 118, and the electromagnetic blocker 120 form a lid assembly (examples of which are provided in FIGS. 4-6). While FIG. 1 shows the thermo-optical shield 116 positioned between the transparent structure 114 and the thermopile sensors, other configuration are possible, including, but not limited to, the thermo-optical shield 116 being mounted to the lid assembly or integrated into the lid assembly, such that the transparent structure 114 can be positioned between at least a portion of the thermo-optical shield 116 and the thermopile sensors.

The sensor package 100 can include an optical aperture positioned on an interior surface of the transparent structure 114 to define or assist in defining a field of view of the thermopile sensors. For example, in an implementation, the sensor package 100 includes an aperture layer 122 positioned on an interior surface 124 of the transparent structure 114, the aperture layer 122 defining an aperture 126 positioned at least approximately over the thermopile sensor 102, such that electromagnetic radiation may be transmitted from an external object or environment to the thermopile sensor 102 while at least substantially preventing the transmission of the electromagnetic radiation from the object or environment to the reference thermopile sensor 112. The aperture layer 122 can comprise materials configured to define or assist in defining the field of view of the thermopile sensors. For example, in implementations, the aperture layer 122 comprises on or more layers of titanium-tungsten (Ti—W), chrome, copper, aluminum, silicon oxide, alloys and oxides thereof, or combinations thereof. The electromagnetic blocker 120 can similarly define an aperture to mirror aperture 126 over the thermopile sensor 102. As shown in FIG. 1, the electromagnetic blocker 120 is thermally insulated from the transparent structure 114 and the aperture layer 122 by the thermal insulation layer 118. As such, the electromagnetic blocker 120 may not display substantial thermal gradients, such as those that can be present in a lid assembly of the sensor package (shown in FIG. 2).

In some implementations, the sensor package 100 may include a lens 128 to focus electromagnetic radiation incident upon the lens 128. For example, the lens 128 may shape (e.g., collimate) the electromagnetic radiation incident upon the lens 128 and to transmit the electromagnetic radiation to the thermopile sensor 102 (e.g., to the membrane of the thermopile sensor 102). The lens 128 may comprise silicon or other suitable material, and may comprise the same or different material as the transparent structure 114.

Figure 2:
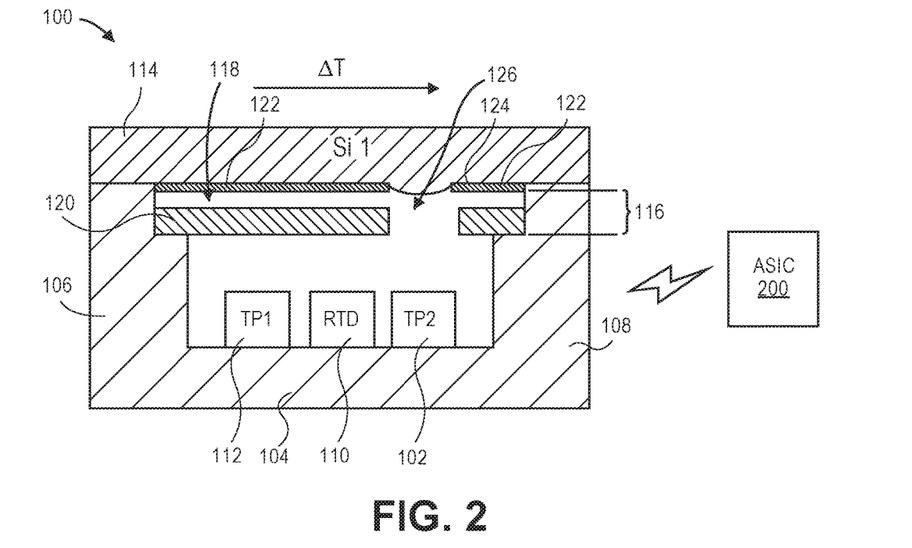
FIG. 2 is a partial cross-sectional side view illustrating the sensor package shown in FIG. 1, where the thermopile sensor, the reference thermopile sensor, and the reference temperature sensor are communicatively connected to an application-specific integrated circuit in accordance with an example implementation of the present disclosure.

Referring to FIG. 2, a lateral temperature gradient is shown on the lid assembly (e.g., laterally across at least the transparent material 114). Such temperature gradient can be induced from air flow, energy sources, or so forth acting on and across external surfaces of the sensor package 100. In the absence of the thermo-optical shield 116, the thermopile sensor 102 and the reference thermopile sensor 112 could sample the lid assembly differently, due to the lateral temperature gradient. Accordingly, the thermo-optical shield 116 thermally and electromagnetically insulates the thermopile sensor 102 and the reference thermopile sensor 112 from the transparent material 114 (including temperature gradients therethrough). The sensor package 100 can also have temporal variations in temperature. For instance, in the case that the thermopile sensor 102 and the reference thermopile sensor 112 are read out at different times, the temperature of the sensor package 100 measured by the thermopile sensor 102 and the reference thermopile sensor 112 can be different. This temporal variance can introduce error during the subtraction of the reference signal of the reference thermopile sensor 112 from the signal of the thermopile sensor 102. Accordingly, in implementations, the output signals from the thermopile sensor 102 and the reference thermopile sensor 112 are read synchronously.

For example, in one or more implementations, integrated circuitry 200 (an application-specific integrated circuit) may be employed to generate a digital signal representing the electromagnetic radiation emitted from an external object or environment (e.g., determine a temperature associated with the object/environment). For example, the application-specific integrated circuit 200 may comprise a module that is electrically connected to the sensor package 100 to receive the electrical signals generated by the thermopile sensor 102 and the reference temperature sensor 112 in response to the electromagnetic radiation occurring within the limited spectrum of wavelengths. In implementations, the circuitry may comprise analog-to-digital converter circuitry, programmable-gain amplifier (PGA) circuitry, fixed-gain amplifier circuitry, combinations thereof, or the like. The application-specific integrated circuit 200 is configured to receive the electrical signal from the thermopile sensor 102, the electrical signal from the reference temperature sensor 110, and the electric signal from the reference thermopile sensor 112 to generate a signal representing a temperature associated with an external object or environment. In implementations, the application-specific integrated circuit 200 is configured to synchronously sample the electrical signal from the thermopile sensor 102 and the electric signal from the reference thermopile sensor 112 to reduce or substantially eliminate error associated with a lateral temperature gradient across the sensor package 100. For example, the application-specific integrated circuit 200 is configured to remove (e.g., subtract) the electrical signal that is common to both electrical signals (e.g., the electrical signal that represents the electromagnetic radiation associated with the package) and generate a signal that represents the temperature associated with the object or environment. In implementations, the application-specific integrated circuit 200 is configured to generate a digital signal representing the temperature associated with the object or environment. In an implementation, the application-specific integrated circuit 200 may store calibration parameters to generate corresponding digital calculations.

Figure 3:
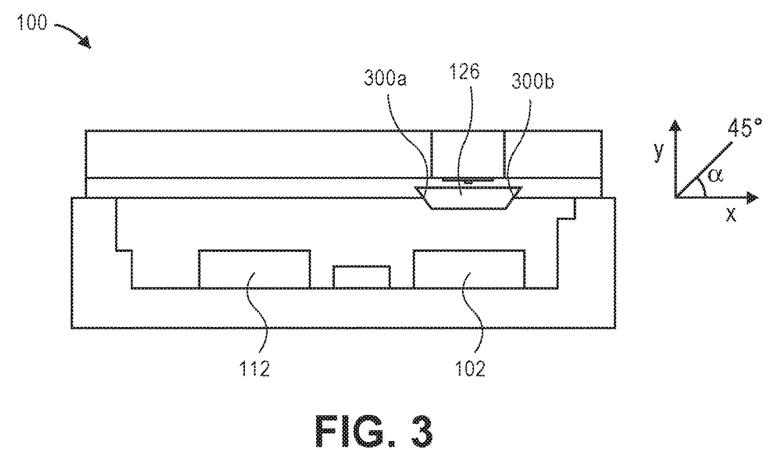
FIG. 3 is a partial cross-sectional side view illustrating a sensor package having an angled aperture disposed in a thermo-optical shield in accordance with an example implementation of the present disclosure.

When light is received by an aperture of a material, the light can impact sidewall portions of the aperture, causing light to reflect off the material of the sidewall portions. Where a sensor is disposed below the aperture, the reflection of the light can adversely impact the optics of the sensor (e.g., the field of view of the sensor). Referring to FIG. 3, the sensor package 100 includes an aperture 126 having angled sidewalls 300 (angled sidewalls 300*a* and 300*b* are shown) disposed in a thermo-optical shield in accordance with an example implementation of the present disclosure. The angled sidewalls 300 can be angled to reflect light away from the interior of the sensor package 100 (e.g., away from the thermopile sensor 102). In implementations, the reflected light is reflected into the cavity between the electromagnetic block 120 and the transparent material 114, where the reflected light can ultimately be absorbed, scattered, or the like. In one or more implementations, the angled sidewalls 300 include an angle from the horizontal (e.g., x-axis) of about 45 degrees or shallower, as shown in FIG. 3. In one or more implementations, the angled sidewalls include an angle of between about 45 degrees and about 1 degree from the horizontal (e.g. x-axis). In one or more implementations, the sensor package 100 can include a non-reflecting material in an interior of the sensor package 100 to mitigate the adverse impact of light reflection within the sensor package 100. For example, the thermo-optical shield 116 can comprise a non-reflecting material, can be at least partially coated with a non-reflecting material, or so forth. Examples of non-reflecting materials include, but are not limited to, glass, coated silicon, particulate coatings of low fill factor, low density metals (e.g., particulate bismuth, particulate silver, particulate gold), titanium tungsten, or so forth.

Figure 4:
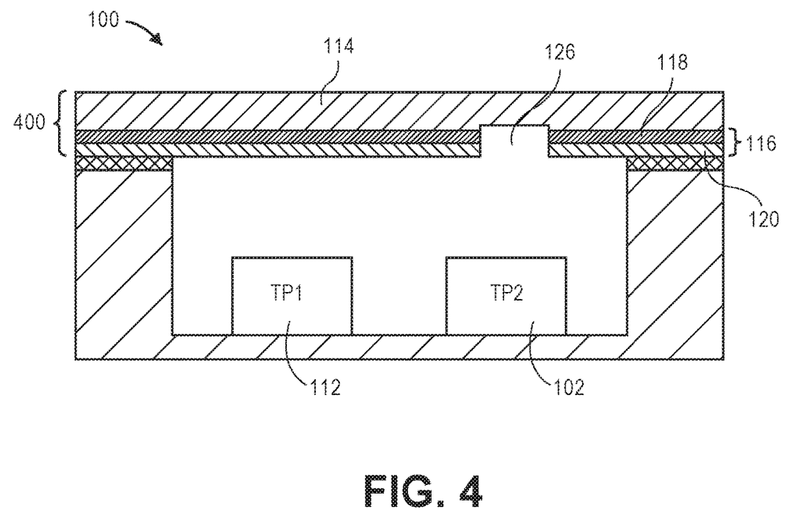
FIG. 4 is a partial cross-sectional side view illustrating a sensor package having a thermally-insulating layer as part of a lid assembly above the thermopile sensors in accordance with an example implementation of the present disclosure.
Figure 5:
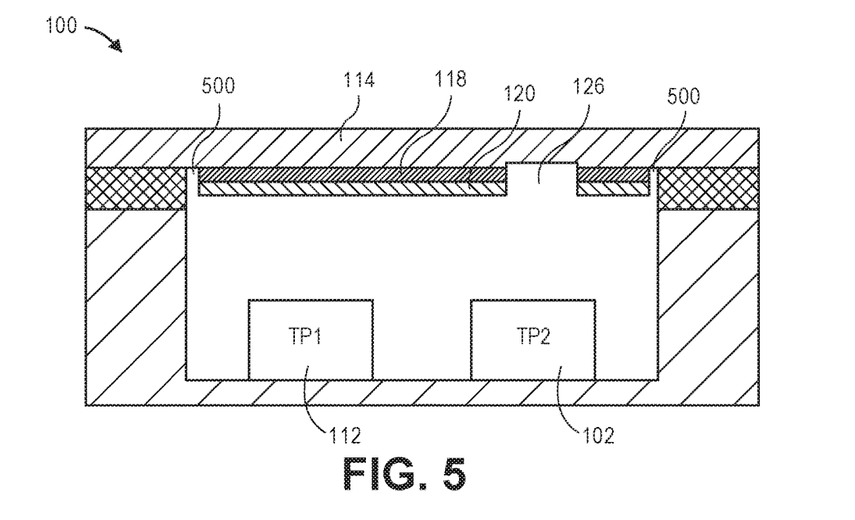
FIG. 5 is a partial cross-sectional side view illustrating a sensor package having a thermally-insulating layer as part of a lid assembly above the thermopile sensors in accordance with an example implementation of the present disclosure.

Referring to FIGS. 4 and 5, a sensor package 100 includes thermally-insulating layer 118 as part of a lid assembly 400 above the thermopile sensors in accordance with an example implementation of the present disclosure. The lid assembly 400 includes the thermally-insulating layer 118 and can include an electromagnetic blocker 120 as part of a thermo-optical shield 116. The lid assembly 400 can be affixed, mounted, or the like, to the supporting structure of the sensor package 100 (shown as 402), such as via an adhesive (e.g., an epoxy), a glass, a metal, or a metal alloy (e.g., a solder). As shown in FIG. 5, the thermo-optical shield 116 can define apertures 500 adjacent the first wall structure 106 and the second wall structure 108 of the sensor package 100. In implementations, the apertures 500 facilitate adhesion of the lid assembly directly to the sensor package structure (e.g., via the first wall structure 106 and the second wall structure 108), while maintaining separation of the bonding/affixing region 402 and the thermo-optical shield 116, particularly in implementations where the thermo-optical shield 116 comprises materials that are less robust than those forming the transparent material 114. As shown, the thermo-optical shield 116 remains above the reference temperature sensor 112 to substantially block the electromagnetic radiation occurring in a limited spectrum of wavelengths from reaching the reference thermopile sensor 112, and to thermally isolate the temperature of the lid assembly from the field of view of the reference thermopile sensor 112.

Figure 6:
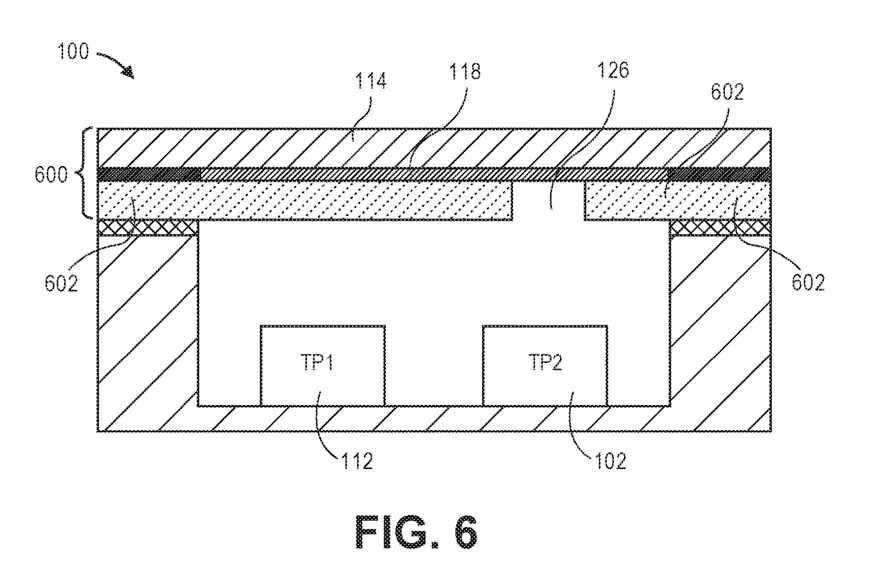
FIG. 6 is a partial cross-sectional side view illustrating a sensor package having a thermally-insulating layer integrated within the lid assembly in accordance with an example implementation of the present disclosure.

Referring to FIG. 6, a sensor package 100 is shown having a thermal insulation layer 118 integrated within a lid assembly 600 in accordance with an example implementation of the present disclosure. The lid assembly 600 includes a transparent structure 114, a barrier layer 602, and the thermal insulation layer 118 positioned between the transparent structure 114 and the barrier layer 602. In one or more implementations, the barrier layer 602 includes a glass barrier material or a silicon barrier material. The barrier layer 602 can further define an aperture 126, such as when the barrier layer 602 comprises a glass barrier material.

In some implementations, the sensor package 100 includes a berm (e.g., barrier) structure that would be configured to mitigate electromagnetic radiation that entered through the aperture 126 to reach the reference thermopile sensor 112. The berm structure may comprise any suitable material that prevents transmission of electromagnetic radiation within the limited spectrum of wavelengths. The berm may be a structure that is mounted or affixed through a suitable epoxy process to the lid assembly. In some implementations, the berm serves as a structure to partition a sensor cavity into multiple sections (e.g., a first section including the thermopile sensor 102 and a second section including the reference thermopile sensor 112). In some implementations, the berm may be mounted to substrate 104 or may be a part of the reference temperature sensor 110.

Figure 7:
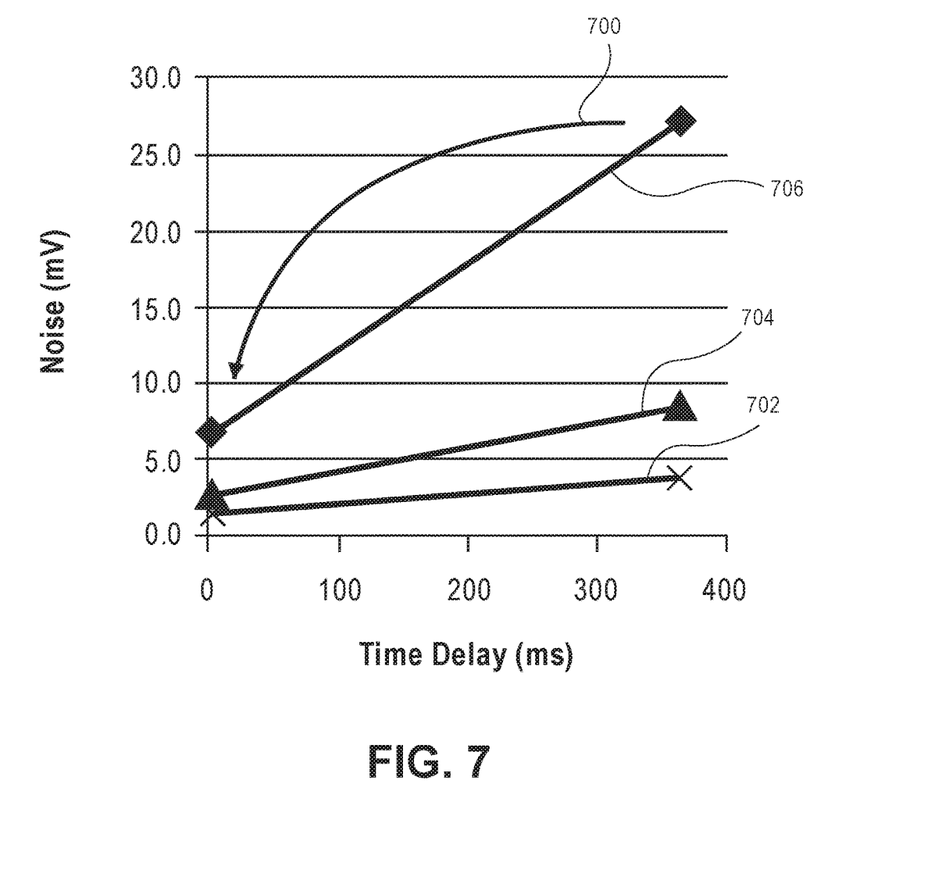
FIG. 7 is a chart illustrating noise versus time delay for various package configurations in accordance with example implementations of the present disclosure.

Referring to FIG. 7, a chart is shown illustrating the impact of synchronous sampling 700 of the electrical signal from the thermopile sensor 102 and the electric signal from the reference thermopile sensor 112, and also the impact of the thermo-optical shield on noise of the overall sensor package. As shown, when the thermo-optical shield includes an air gap (e.g., thermally-insulating layer 118) and an additional solid layer (e.g., electromagnetic blocker 120), shown as 702, the noise is minimized with respect to barriers incorporating a dielectric material disposed directly on a silicon lid, shown as 704, or a package having no thermo-optical layer (i.e., only have a silicon lid), shown as 706.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:
1. A sensor package comprising:
    a substrate;
    a thermopile sensor disposed over the substrate;
    a reference thermopile sensor disposed over the substrate;
    a reference temperature sensor disposed over the substrate and adjacent to the thermopile sensor and the reference thermopile sensor;
    a lid assembly disposed over the thermopile sensor, the reference thermopile sensor, and the reference temperature sensor, the lid assembly comprising a transparent structure that passes electromagnetic radiation occurring in a limited spectrum of wavelengths; and
    a thermo-optical shield, at least a portion of which is positioned between the transparent structure and one or more of the thermopile sensor, the reference thermopile sensor, or the reference temperature sensor, wherein the thermo-optical shield defines an aperture positioned over at least a portion of the thermopile sensor and the aperture includes angled sidewalls.

2. The sensor package as recited in claim 1, further comprising a support structure disposed about the substrate for supporting the lid assembly.

3. The sensor package as recited in claim 1, wherein the angled sidewalls include an angle of between about 45 degrees and about 1 degree from horizontal.

4. The sensor package as recited in claim 1, further comprising an aperture layer positioned between the transparent structure of the lid assembly and at least a portion of the thermo-optical shield, the aperture layer including a metallic material defining an aperture positioned over at least a portion of the thermopile sensor.

5. The sensor package as recited in claim 1, wherein the sensor package is configured to be in electrical communication with application-specific integrated circuitry, the application-specific integrated circuitry being configured to generate an electrical signal corresponding to electromagnetic radiation detected by the sensor package.

6. The sensor package as recited in claim 5, wherein the application-specific integrated circuitry is further configured to synchronously sample an electrical signal from the thermopile sensor and an electric signal from the reference thermopile sensor.

7. A system comprising:
    a sensor package, the sensor package comprising:
    a substrate;
    a thermopile sensor disposed over the substrate;
    a reference thermopile sensor disposed over the substrate;

a reference temperature sensor disposed over the substrate and adjacent to the thermopile sensor and the reference thermopile sensor;

a lid assembly disposed over the thermopile sensor, the reference thermopile sensor, and the reference temperature sensor, the lid assembly comprising a transparent structure that passes electromagnetic radiation occurring in a limited spectrum of wavelengths; and a thermo-optical shield, at least a portion of which is positioned between the transparent structure and one or more of the thermopile sensor, the reference thermopile sensor, or the reference temperature sensor;

application-specific integrated circuitry in electrical communication with the sensor package, the application-specific integrated circuitry configured to generate an electrical signal corresponding to electromagnetic radiation detected by the sensor package; and an aperture layer positioned between the transparent structure of the lid assembly and at least a portion of the thermo-optical shield, the aperture layer including a metallic material defining an aperture positioned over at least a portion of the thermopile sensor.

8. The system as recited in claim 7, further comprising a support structure disposed about the substrate for supporting the lid assembly.

9. The system as recited in claim 7, wherein the application-specific integrated circuitry is further configured to synchronously sample an electrical signal from the thermopile sensor and an electric signal from the reference thermopile sensor.

10. The system as recited in claim 7, wherein the thermo-optical shield defines an aperture positioned over at least a portion of the thermopile sensor.

11. The system as recited in claim 10, wherein the aperture includes angled sidewalls.

12. The system as recited in claim 11, wherein the angled sidewalls include an angle of between about 45 degrees and about 1 degree from horizontal.

* * * * *